US012728330B2

(12) United States Patent
Carr et al.

(10) Patent No.: US 12,728,330 B2
(45) Date of Patent: Sep. 8, 2026

(54) IDENTIFYING THE LOCATION OF CONTACT BETWEEN A BALL AND A BAT

(71) Applicant: Brian Carr, Cambridge, MA (US)

(72) Inventors: Brian Carr, Cambridge, MA (US); Hong An, North Andover, MA (US)

( * ) Notice: Subject to any disclaimer, the term of this patent is extended or adjusted under 35 U.S.C. 154(b) by 302 days.

(21) Appl. No.: 17/964,374

(22) Filed: Oct. 12, 2022

(65) Prior Publication Data

US 2023/0118884 A1 Apr. 20, 2023

Related U.S. Application Data

(60) Provisional application No. 63/256,666, filed on Oct. 18, 2021.

(51) Int. Cl.

| | |
|---|---|
| ***B32B 3/26*** | (2006.01) |
| ***A63B 60/46*** | (2015.01) |
| ***B32B 7/12*** | (2006.01) |
| *A63B 69/00* | (2006.01) |

(52) U.S. Cl.

CPC .............. *A63B 60/46* (2015.10); *B32B 3/266* (2013.01); *B32B 7/12* (2013.01); *A63B 2069/0008* (2013.01); *A63B 2209/10* (2013.01); *B32B 2250/03* (2013.01); *B32B 2307/732* (2013.01); *B32B 2405/00* (2013.01); *B32B 2519/00* (2013.01)

(58) Field of Classification Search

None

See application file for complete search history.

(56) References Cited

U.S. PATENT DOCUMENTS

| | | | | |
|---|---|---|---|---|
| 3,754,764 A | | 8/1973 | Manheck | |
| 3,806,132 A | | 4/1974 | Brandell | |
| 4,313,524 A | * | 2/1982 | Rose | F02C 7/24 181/291 |
| 5,349,893 A | * | 9/1994 | Dunn | F41H 5/04 428/116 |

(Continued)

FOREIGN PATENT DOCUMENTS

| | | |
|---|---|---|
| DE | 102009038857 | 3/2011 |
| KR | 100414618 | 1/2004 |

(Continued)

OTHER PUBLICATIONS

Bok Yong Lee, machine translation of KR 10-1657418, Sep. 13, 2016 (Year: 2016).*

(Continued)

*Primary Examiner* — Mary I Omori

(74) *Attorney, Agent, or Firm* — Anderson Gorecki LLP

(57) ABSTRACT

An impact label for use as a baseball training aid includes a deformable layer and an incompressible layer which may include aluminum foil and paper, respectively. The incompressible layer includes voids distributed in a regular pattern. A first side of the incompressible layer is adhered to the deformable layer. A second side of the incompressible layer is formed around the barrel of a baseball bat, e.g., via an adhesive on a base layer. Areas of the deformable layer proximate to the voids and within an area of contact with a baseball during a swing of the bat are adapted to deform in response to contact with the baseball, thereby creating dimples that are indicative of the area of contact and force of contact.

6 Claims, 5 Drawing Sheets

(56) References Cited

U.S. PATENT DOCUMENTS 5,609,530 A 3/1997 Butler
6,336,220 B1 * 1/2002 Sacks ................... A43B 1/0009 428/116
7,134,967 B2 11/2006 Lester
2003/0077423 A1 * 4/2003 Flanigan ................... B32B 3/30 428/188
2005/0153790 A1 * 7/2005 Lester ................ A63B 69/3617 473/237
2005/0233820 A1 * 10/2005 Matthews .......... A63B 69/3617 473/237
2013/0244028 A1 * 9/2013 Yang .......................... C09J 7/22 525/190
2015/0147511 A1 * 5/2015 Parloo ..................... B32B 15/06 428/116
2018/0194917 A1 * 7/2018 Dikeman ................ B32B 15/20
2022/0118733 A1 * 4/2022 Yoneshima ............. B32B 5/263

FOREIGN PATENT DOCUMENTS

KR 1230079 B1 * 2/2013
KR 1657418 B1 * 9/2016 ............. A63B 53/00
WO WO03031000 4/2003
WO WO-2021166951 A1 * 8/2021 ............... B29D 7/01
WO WO-2021186388 A1 * 9/2021 ............. B32B 15/00

OTHER PUBLICATIONS

"Finger Ten Golf Club Impact Tape Labels", amazon.com. https://www.amazon.com/Standard-Recorder-Stickers-Training-Practice/dp/B08628VHTM/ref=sr_1_2_sspa?.
"Impact Improver", impactimprover.com. https://www.impactimprover.com/collections/products/products/your-indoor-practice-solution.
"Impact Tape", pgatoursuperstore.com https://www.pgatoursuperstore.com/impact-tape/1113212.html?.
"The New Face of Golf Impact Tape," directimpactgolf.com. Sep. 30, 2020. https://directimpactgolf.com/.

* cited by examiner

IDENTIFYING THE LOCATION OF CONTACT BETWEEN A BALL AND A BAT

TECHNICAL FIELD

The presently disclosed invention is generally related to sports training aids.

BACKGROUND

A variety of sports involve the act of striking a ball with a hand-held object such as a bat or club. In general, evaluation of athletic technique for training purposes is facilitated by knowledge of the location of contact between the ball and the hand-held object. Training aids based on temperature and pressure sensitive materials are known. Impact tape, for example, includes a temperature sensitive film backed by an adhesive layer. Impact tape can be adhered to the flat face of a golf club to record the location of impact on the club face by changing color in response to friction-induced temperature changes resulting from contact between the golf ball and the impact tape. One drawback of impact tape is that it functions poorly when the contact surfaces are smooth and rounded, particularly when the plane of swing coincides with the plane of travel of the ball. Those conditions are generally not encountered in the sport of golf because the club face is relatively flat, lofted, and has lateral grooves, and the surface of the golf ball is densely dimpled. However, a well-executed hit of a baseball with a baseball bat may leave little or no visual evidence on impact tape if the contact location does not include the seam of the ball and the plane of swing bisects the sphere of the ball. Another type of sports training aid includes a relatively thick, pressure sensitive layer that is permanently compressed at the area of contact due to the force of impact. Such training aids are not reliant on frictional heat and angled contact to generate visual evidence of the location of contact, but the thickness of the pressure sensitive layer required to yield clearly visible evidence of contact inhibits flexibility and changes the physical interaction between the club or bat and the ball. For example, a rigid foam layer that permanently compresses at the location of contact cannot be molded to the rounded shape of a baseball bat, and the thickness of the rigid foam would result in an undesirable mushy or spongy feeling when the bat contacts the ball.

SUMMARY

All examples, aspects and features mentioned in this document can be combined in any technically possible way.

In accordance with some implementations, an apparatus comprises: a lamination adapted for use as a sports training aid, the lamination comprising: a deformable layer; and an incompressible layer characterized by voids distributed in a regular pattern, the incompressible layer disposed against the deformable layer, wherein areas of the deformable layer proximate to the voids and within an area of contact with a mass are adapted to deform in response to contact with the mass, thereby creating deformations that are indicative of the area of contact.

In accordance with some implementations, a sports training aid comprises: a paper layer characterized by voids distributed in a regular pattern; and a deformable layer disposed against the paper layer, wherein areas of the deformable layer proximate to the voids and within an area of contact with a mass are adapted to deform in response to contact with the mass, thereby creating deformations that are indicative of the area of contact.

DETAILED DESCRIPTION

Figure 1A:
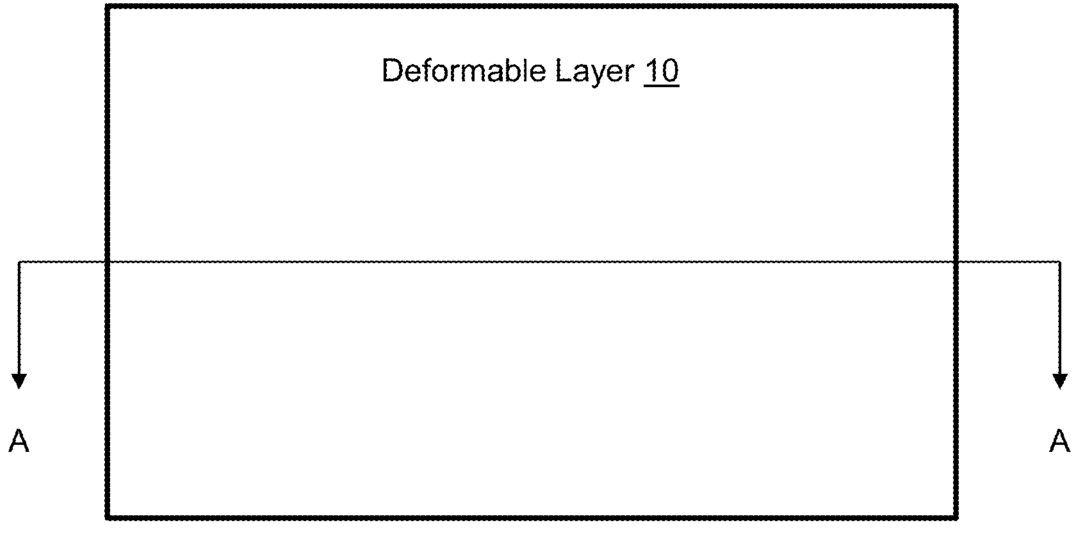
FIG. 1A is a top view of a thin, flexible contact location indicating apparatus for use with sports training aids.
Figure 1B:
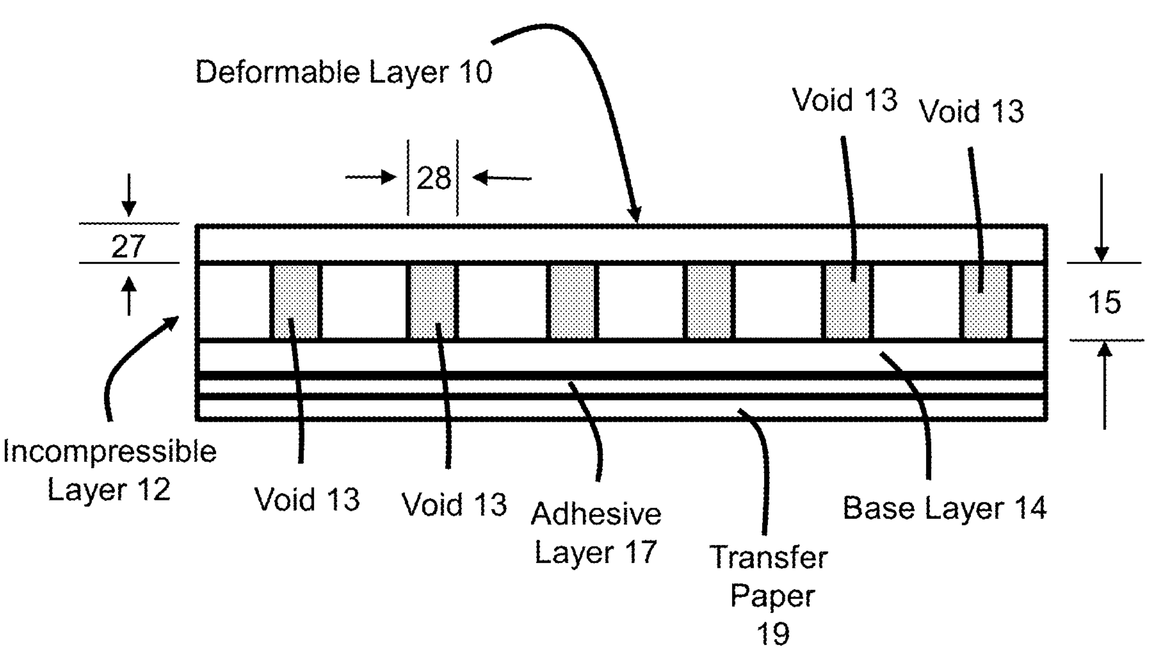
FIG. 1B is a cross-sectional view of the apparatus of FIG. 1A taken along A-A.
Figure 2:
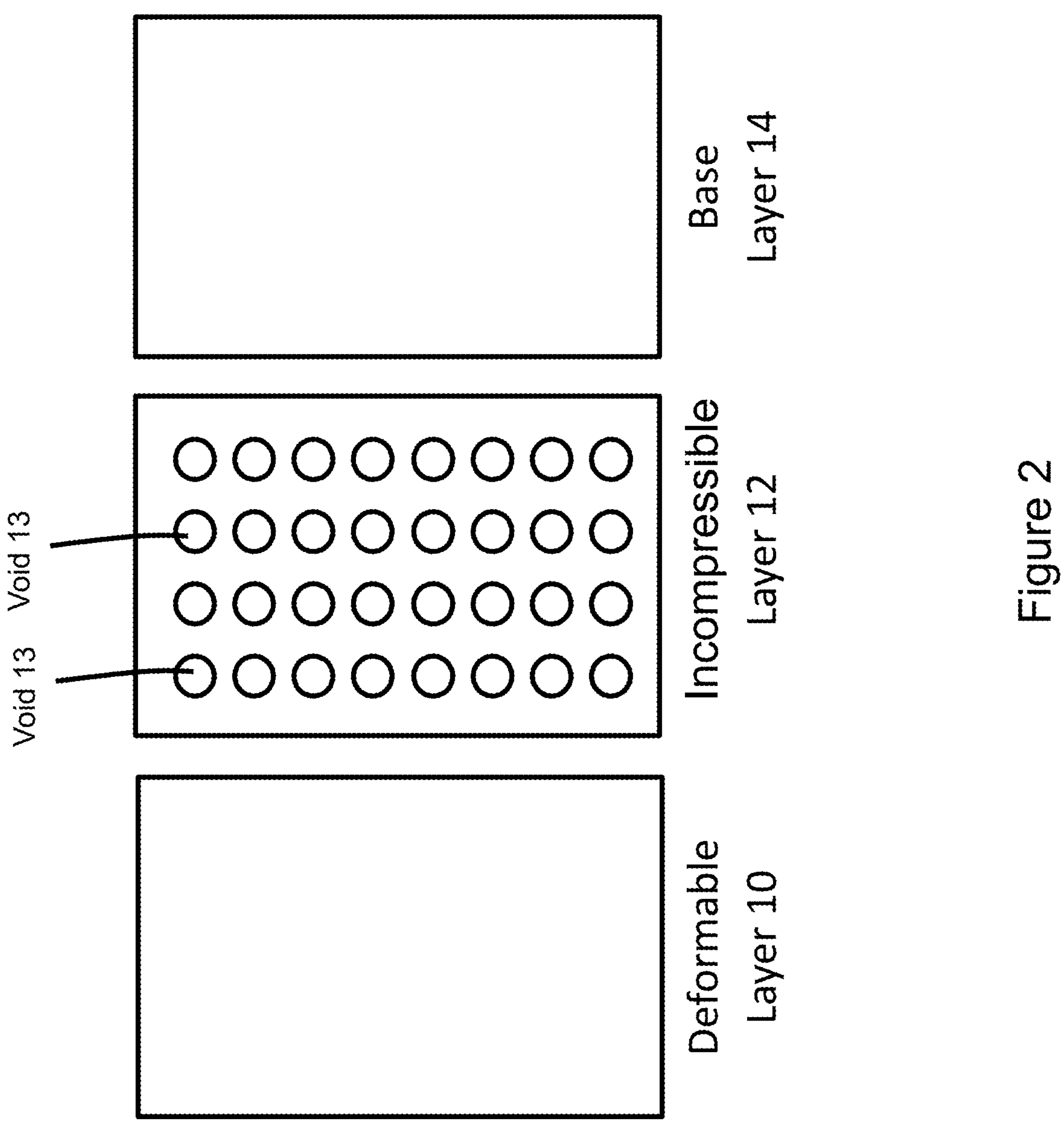
FIG. 2 illustrates the deformable, incompressible, and base layers placed side-by-side.

Referring to FIGS. 1A, 1B, and 2, a contact location indicating apparatus for use with sports training aids includes a thin, flexible deformable layer 10 disposed on a thin, flexible incompressible layer 12 that is configured with an array of voids 13. A base layer 14, adhesive layer 17, and transfer paper 19 are optionally included. The deformable layer 10, incompressible layer 12, and optional layers may be fused together using adhesive to form a laminated strip of labels that may be packaged as a roll. The adhesive layer 17 facilitates temporarily affixing the apparatus to sports equipment such as a baseball bat, golf club, hockey stick, tennis racket, etc. The transfer paper 19 protects the adhesive layer prior to use. Alternatively, or additionally, the apparatus may be incorporated into a training aid that includes other features.

The deformable layer 10 includes a thin, flexible, malleable, non-resilient sheet, film, or foil. For example, the deformable layer may include a metallic foil such as aluminum foil characterized by a thickness dimension 27 of 0.006-0.200 mm (0.236-7.87 mils). The incompressible layer 12 includes a thin, flexible, incompressible sheet, film, or foil. For example, the incompressible layer may be formed from paper, polycarbonate, acrylic, ABS, metal, or other material characterized by a thickness dimension 15 equal to or greater than 0.10 mm (3.94 mils). For example, a paper incompressible layer may be characterized by a thickness in a range of 0.02-1.20 mm (0.79-47.24 mils), inclusive. The optional layers may be characterized by a thickness of less than 0.10 mm (3.94 mils) in some implementations.

The voids 13 may be distributed in a regular geometric pattern across the incompressible layer 12. The voids may, but do not necessarily, traverse the entirety of the thickness dimension 15 of the incompressible layer. For example, the voids may only partly traverse the thickness dimensions of the incompressible layer and have an open distal end where the incompressible inner layer is disposed against the deformable layer 10. The voids may have any of a wide variety of shapes, but in the illustrated example the voids are cylindrical and traverse the thickness dimension of the incompressible layer such as would result from drilling through the incompressible layer with a typical drill bit, i.e., with circular openings at the inner and outer surfaces of the incompressible layer. However, the voids are not necessarily formed by drilling and may be formed with a hole press, press punch, or be molded-in. The voids may be characterized by a cross-sectional dimension 28 equal to or greater than 0.10 mm, and in some implementations are within a range of 1.0 mm-10 mm. The deformable layer 10 and the base layer 14 are monolithic and lack voids, at least in some implementations.

Figure 3A:
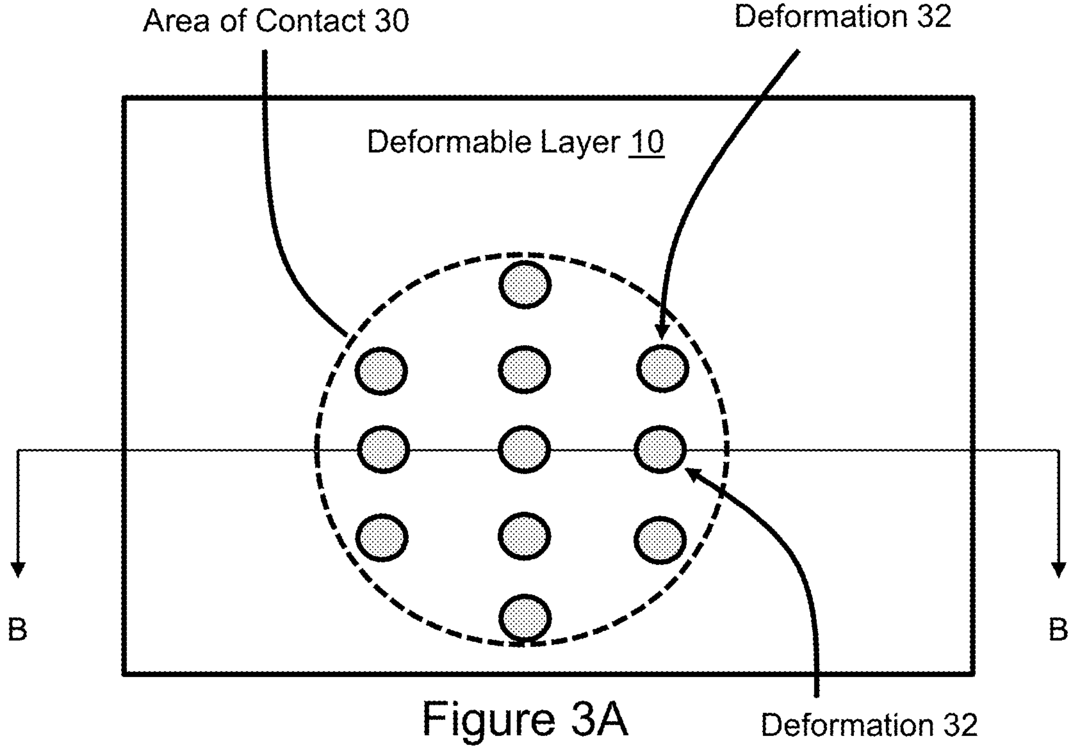
FIG. 3A is a top view of the apparatus with visible deformations in an area of impact.
Figure 3B:
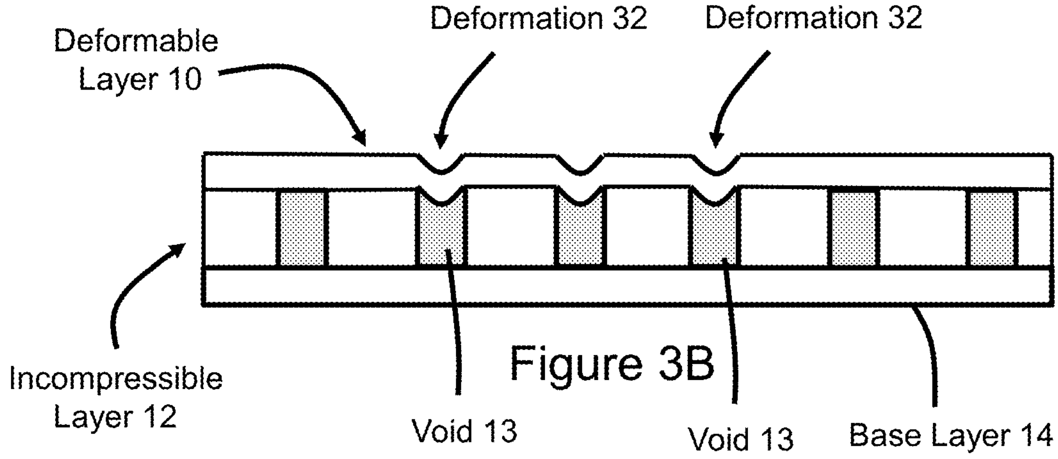
FIG. 3B is a cross-sectional view of the apparatus of FIG. 3A taken along B-B.

Referring to FIGS. 3A and 3B, the apparatus provides a visual indication of the area of contact 30 between the ball and bat (or other sports equipment) by formation of visible deformations 32 in the deformable layer 10. More specifically, the force of contact between the ball and the bat to which the apparatus is affixed causes localized deformation of the deformable layer 10 at the area of contact 30 proximate to the voids 13 in the incompressible layer. Portions of the deformable layer at the area of contact that are not proximate to the voids are not visibly deformed due the relative incompressibility of the incompressible layer. The deformations, which are preferably visible by the naked eye, may be characterized by a depth that varies as a function of force of contact. Thus, the depth of the deformations may provide visual evidence of the force with which the ball was hit by the bat. The distance between adjacent voids may be varied depending on intended use, e.g., based on the diameter of a typical baseball bat and baseball for a baseball training aid. In general, the voids should be formed with sufficient density that multiple deformations 32 are created in the area of contact 30. In some implementations the voids are dispersed with sufficient density such that the circular, elliptical, or other shape of the area of contact can be visually identified from the deformations. The deformable layer may be configured to facilitate viewability of the deformations, e.g., with a selected reflectivity, e.g., measured in Gloss Units, and with material polarization or orientation that causes reflectivity to be directionally variable.

Figure 4:
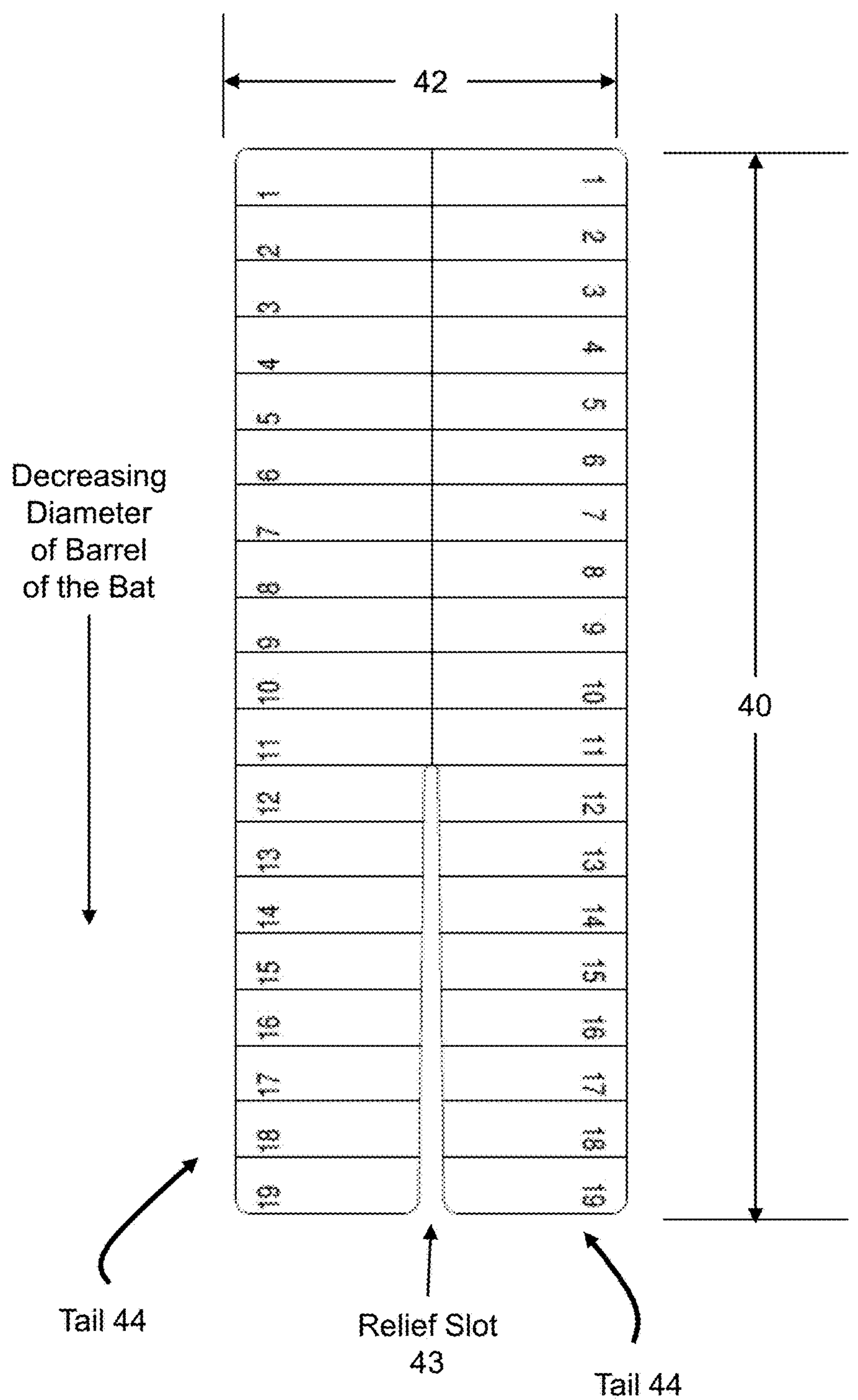
FIG. 4 illustrates a specific implementation of the apparatus adapted for use with a baseball training aid.
Figure 5A:
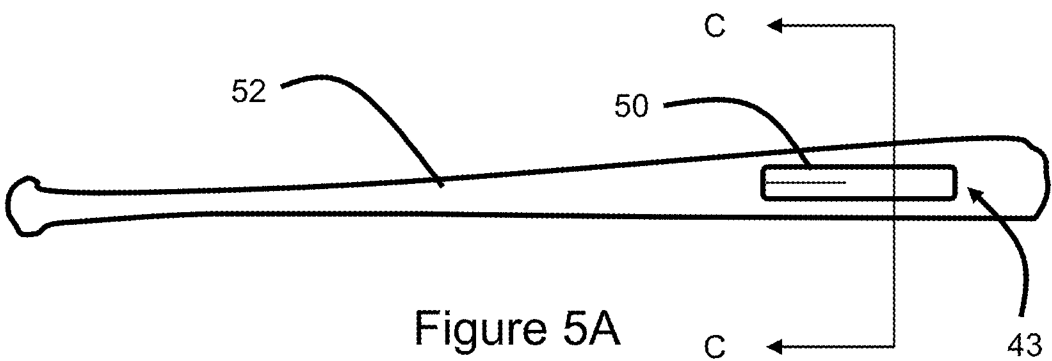
FIG. 5A illustrates a baseball training aid based on the disclosed apparatus mounted on a baseball bat.
Figure 5B:
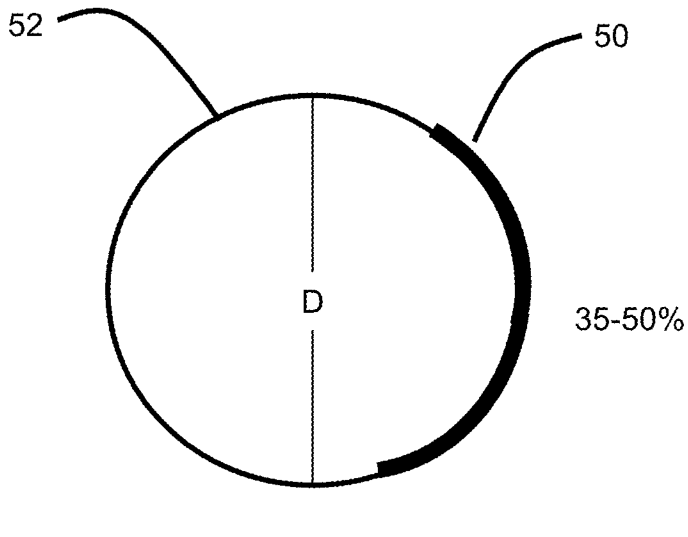
FIG. 5B is a cross-sectional view of the bat and training aid of FIG. 5A taken along C-C.

Referring to FIGS. 4, 5A, and 5B, an individual ball-impact-locating label 50 may be manufactured as part of a sheet or strip of labels that may be packaged as a roll. The individual label 50 is characterized by a rectangular shape. A longer length dimension 40 is disposed along the bat 52 lengthwise, parallel to the axis of the barrel of the bat. A shorter width dimension 42 is disposed partially around the curvature of the barrel of the bat. For example, the width dimension may be selected such that the label covers 35-50% of the circumference of a circle defined by a cross-section of the bat where the label is affixed. A relief slot 43 is formed from about a midpoint along the length and width dimensions and extends to a distal end of the label, thereby forming two equal size tails 44. The distal end proximate to the tails is affixed to the barrel of the bat nearer to the handle of the bat. Depending on the bat and placement of the label, the diameter D of the barrel of the bat may vary along the length of the label 50. The relief slot 43 and tails 44 facilitate affixing the label to the smaller diameter portion of the bat without formation of folds or bubbles due to variations in barrel diameter.

Although advantages should not be considered to be limitations of the inventive concepts, at least some implementations are suited for use with baseball training aids because the area of contact and relative force of contact are indicated with evidence that is visible to the naked eye and reliably generated regardless of the part of the ball that contacts the bat, the plane of swing relative to travel of the ball, or the angle or offset of the point of contact relative to the leading edge of the bat during the swing. Further, because the apparatus is relatively thin and incompressible, it does not interfere with bat-ball contact or create an undesirable, unnatural feedback to the hitter. However, the invention is not limited to use with baseball training aids or even sports training aids.

A number of features, aspects, embodiments, and implementations have been described. Nevertheless, it will be understood that a wide variety of modifications and combinations may be made without departing from the scope of the inventive concepts described herein. Accordingly, those modifications and combinations are within the scope of the following claims.

What is claimed is:

1. An apparatus comprising:

a two-layer lamination adapted to flex to conform to a variety of bat diameters and be temporarily affixed to a bat for use as a sports training aid that indicates an area of contact between a bat and a ball that is struck with the bat, the two-layer lamination comprising:

a solid flexible first layer characterized by non-resiliency; and a perforated flexible incompressible second layer characterized by a first outer surface against which the first layer is adapted to be affixed and a second outer surface adapted to be temporarily affixed directly to the bat, the first outer surface and second outer surface characterized by being parallel and between which a maximum thickness dimension of the second layer is defined and through which cylindrical air-filled voids are distributed in a regular pattern, the cylindrical voids formed entirely through the maximum thickness dimension of the second layer and having a cross-sectional dimension that defines a circle characterized by a diameter in a range of 1.0 mm to 10 mm inclusive, the first outer surface of the second layer disposed against the first layer such that the voids are adjacent to the first layer along the cross-sectional dimension, adjacent pairs of voids being spaced apart by at least a distance equivalent to the diameter of the voids;

wherein material and thickness characteristics of the first layer relative to the cross-sectional dimension of the voids and the distance between adjacent voids are selected such that areas of the first layer adjacent to the voids and within the area of contact with the ball are adapted to plastically deform at least partly into the voids in response to force associated with striking of the ball with the bat, thereby creating permanent deformations that are indicative of the area of contact and visible to a naked eye, and wherein portions of the first layer at the area of contact that are not adjacent to the voids are not visibly deformed.

2. The apparatus of claim 1 further comprising the first layer being adapted to create an indication of force of contact based on depth of the deformations.

3. The apparatus of claim 1 further comprising the first layer being characterized by a thickness of 0.006-0.200 mm, inclusive.

4. The apparatus of claim 3 wherein the first layer comprises a metallic foil.

5. The apparatus of claim 1 wherein the second layer comprises paper, polycarbonate, acrylic, acrylonitrile butadiene styrene (ABS), or metal.

6. The apparatus of claim 5 wherein the maximum thickness is in a range of 0.02-1.20 mm, inclusive.

* * * * *